(12) United States Patent
Potthast

(10) Patent No.: US 12,446,558 B2
(45) Date of Patent: Oct. 21, 2025

(54) BEEHIVE AND METHOD FOR PRODUCING A BEEHIVE

(71) Applicant: HIIVE UG (haftungsbeschränkt), Teltow (DE)

(72) Inventor: Philip Potthast, Berlin (DE)

(73) Assignee: HIIVE UG (haftungsbeschränkt), Teltow (DE)

( * ) Notice: Subject to any disclaimer, the term of this patent is extended or adjusted under 35 U.S.C. 154(b) by 90 days.

(21) Appl. No.: 18/289,408

(22) PCT Filed: May 5, 2022

(86) PCT No.: PCT/EP2022/062111
§ 371 (c)(1),
(2) Date: Nov. 3, 2023

(87) PCT Pub. No.: WO2022/233999
PCT Pub. Date: Nov. 10, 2022

(65) Prior Publication Data
US 2024/0365757 A1    Nov. 7, 2024

(30) Foreign Application Priority Data
May 7, 2021   (EP) .................................. 21172717

(51) Int. Cl.
*A01K 47/02*   (2006.01)

(52) U.S. Cl.
CPC .................................. *A01K 47/02* (2013.01)

(58) Field of Classification Search
CPC ......... A01K 47/02; A01K 47/06; A01K 47/00
(Continued)

(56) References Cited

U.S. PATENT DOCUMENTS

| | | | | |
|---|---|---|---|---|
| 70,338 A | * | 10/1867 | Jones ..................... | A01K 47/00 449/31 |
| 207,731 A | * | 9/1878 | Gale ..................... | A01K 47/06 449/13 |

(Continued)

FOREIGN PATENT DOCUMENTS

| | | |
|---|---|---|
| DE | 825022 C | 12/1951 |
| DE | 870614 C | 3/1953 |

(Continued)

OTHER PUBLICATIONS

International Search Report of the International Searching Authority, issued in PCT/EP2022/062111, mailed Sep. 9, 2022; ISA/EP.
(Continued)

*Primary Examiner* — Monica L Perry
*Assistant Examiner* — Maria E Graber

(57) ABSTRACT

The invention relates to a beehive comprising: an interior construction (1) that has an inner cavity (3) designed to be occupied by a bee colony and to accommodate honeycomb built by the colony; a support device (2) in which the interior construction (1) is received; and an insulation device (4) which is received on the support device (2) and has a layered construction. The layered construction comprises: a vapour-control layer (5) which is formed by a vapour-diffusion-inhibiting material and is arranged on the support device (2) so as to surround the interior construction (1); and a insulating layer (6) which is formed by a heat-insulating material and is arranged on the support device (2) so as to surround the vapour-control layer (5). The invention also relates to a method for producing a beehive.

13 Claims, 12 Drawing Sheets

(58) Field of Classification Search
USPC .................. 449/15, 3, 20, 21, 26, 29, 30
See application file for complete search history.

(56) References Cited

U.S. PATENT DOCUMENTS

| | | | | |
|---|---|---|---|---|
| 673,179 | A * | 4/1901 | Smith | A01K 47/06 449/25 |
| 1,370,775 | A * | 3/1921 | Bacon | A01K 47/00 449/37 |
| 4,419,780 | A * | 12/1983 | Shaparew | A01K 47/06 449/14 |
| 4,483,031 | A * | 11/1984 | Shaparew | A01K 47/06 449/14 |
| 4,983,139 | A * | 1/1991 | Kretschmann | A01K 47/06 449/30 |
| 11,324,204 | B2 * | 5/2022 | McCoy | A01K 47/06 |
| 12,173,525 | B2 * | 12/2024 | Condra | A01K 55/00 |
| 2011/0263182 | A1 * | 10/2011 | Custer | A01K 47/06 449/15 |
| 2019/0093341 | A1 * | 3/2019 | Ndobo-Epoy | E04B 1/767 |

FOREIGN PATENT DOCUMENTS

| | | |
|---|---|---|
| DE | 102006052561 A1 | 4/2008 |
| DE | 102013225268 A1 | 6/2015 |
| FR | 959463 A | 3/1950 |

OTHER PUBLICATIONS

International Preliminary report on Patentability, issued in PCT/EP2022/062111, mailed Nov. 16, 2023.

* cited by examiner

BEEHIVE AND METHOD FOR PRODUCING A BEEHIVE

CROSS-REFERENCE TO RELATED APPLICATIONS

This application is a 371 U.S. National Phase of International Application No. PCT/EP2022/062111, filed on May 5, 2022, which claims priority to European Patent Application No. 21172717.7 filed on May 7, 2021. The entire disclosures of the above applications are incorporated herein by reference.

The invention relates to a beehive and to a method for producing a beehive.

BACKGROUND

When keeping honey bees, it is problematic that an increased mortality of bees up to whole populations occurs especially in the winter months. Parasites and diseases can also damage bee populations. In order to counter these problems, bee populations are increasingly being treated with chemicals and pharmaceuticals.

Free-living honey bees preferably nest in tree cavities. Such tree cavities offer good thermal insulation, as a result of which the bees are protected against cold in winter and against excessive heat in summer. Furthermore, wood absorbs moisture, with the result that a microclimate which promotes the bees and beneficial organisms is produced in tree cavities.

Rectangular boxes, so-called Langstroth hives, are widespread for keeping honey bees by humans. These Langstroth hives allow easy access to the bees and in particular facilitate honey harvesting, but do not correspond to the natural habitat of honey bees.

In a traditional method according to the so-called Zeidler craft, bees are kept in handmade tree trunks which are more similar to the natural habitat of the bees. However, this type of bee dwelling is very uneconomical and impracticable, in particular due to difficult access to the bees and the honey.

SUMMARY

The object of the invention is to provide improved technologies for beehives which overcome the problems of known methods of keeping bee populations and in which, in particular, living conditions for keeping honey bees and access to bees and honey are optimized.

To achieve the object, a beehive according to independent claim 1 is provided. Further, a method for producing a beehive is provided. Advantageous embodiments are the subject matter of dependent claims.

According to one aspect, a beehive is provided with an inner structure, a support device and an insulation device. The inner structure is formed with an inner cavity which is configured to be taken by a bee population and to be built out with a honeycomb. The inner structure is received in the support device. The insulation device is received on the support device and has a layer structure. The layer structure has a vapor-barrier layer which is formed with a vapor-diffusion-inhibiting material and which is arranged on the support device so as to surround the inner structure, and an insulation layer which is formed with a heat-insulating material and which is arranged on the support device so as to surround the vapor-barrier layer.

According to a further aspect, a method for producing a beehive is provided. The method comprises providing an inner structure with an inner cavity which is configured to be taken by a bee population and to be built out with a honeycomb, receiving the inner structure in a support device, and receiving an insulation device with a layer arrangement on the support device. Receiving the insulation device comprises surrounding the inner structure with a vapor-barrier layer of the layer arrangement which is formed with a vapor-diffusion-inhibiting material and which is arranged on the support device, and surrounding the vapor-barrier layer with an insulation layer which is formed with a heat-insulating material and which is arranged on the support device.

A vapor-diffusion-inhibiting material is in particular a material which is suitable for being arranged as a two-dimensionally continuous layer with a water vapor diffusion resistance which reduces the diffusion of water in vapor form from air in the inner cavity into the layer structure. In addition, the vapor-diffusion-inhibiting material can be suitable for preventing or slowing down the passage of liquid water. In particular, this can prevent condensation water from forming in the layer structure by means of the vapor-barrier layer, which condensation water leads to moisture damage, in particular mold infestation, of the beehive in the event of insufficient drying.

The vapor-diffusion-inhibiting material can have a water vapor diffusion resistance coefficient $\mu$ which, together with a thickness s of the vapor-barrier layer, results in a water vapor diffusion-equivalent air layer thickness $s_d$ in accordance with DIN EN ISO 12572 which is greater than 0.5 m. Herein, the water vapor diffusion resistance coefficient or the vapor barrier value, as a dimensionless material characteristic value, indicates the factor by which the vapor-diffusion-inhibiting material is tighter with respect to water vapor than an equally thick, stationary air layer. The vapor-barrier layer can be diffusion-slowing, diffusion-inhibiting, diffusion-blocking or diffusion-tight in accordance with DIN 4108-3. In particular, the vapor-barrier layer can have a water vapor diffusion-equivalent air layer thickness $s_d$ of more than 0.25 m, of more than 0.5 m to 10 m, of more than 10 m to 100 m, of more than 100 m to 1500 m or of more than 1500 m. The vapor-barrier layer is preferably diffusion-slowing or diffusion-inhibiting and has a water vapor diffusion-equivalent air layer thickness $s_d$ of more than 0.5 m to 100 m.

The vapor-barrier layer can be a vapor-barrier film. The vapor-barrier film can in particular be a plastic film. For example, the vapor-barrier layer can be a film composed of polypropylene, polyethylene copolymer and/or polypropylene scrim.

The heat-insulating material is a material which is suitable for preventing the inner cavity from cooling down by virtue of the fact that it has such a low thermal conductivity that the coefficient of heat transfer of the insulation layer is sufficiently reduced, in comparison with the vapor-barrier layer and the inner structure, for preventing cooling down. In particular, the coefficient of heat transfer of the insulation layer can be lower than the coefficient of heat transfer of a wood layer having a thickness in the range of 1.5 mm, preferably lower than the coefficient of heat transfer of a wood layer having a thickness in the range of 15 mm.

The heat-insulating material can be moisture-permeable, that is to say in particular permeable to liquid water. This can facilitate drying of the heat-insulating material.

The heat-insulating material can comprise hemp wool. In particular, the insulation layer can be a layer of hemp wool. Alternatively or in addition, the heat-insulating material can comprise animal wool, in particular sheep wool, construction foam, fiber waste and/or other substances suitable for heat insulation. The heat-insulating material can be provided as loose material and/or in the form of a mat.

The layer structure can additionally comprise a weather protection layer which is formed with a diffusion-open material and which is arranged on the support device so as to surround the insulation layer. In particular, the diffusion-open material of the weather protection layer can be impermeable to liquid water and thereby prevent water, for example in the form of precipitations, from penetrating into the insulation layer. For example, the weather protection layer, in accordance with DIN EN ISO 811, can be watertight up to 2,500 mm water column, preferably have a water impermeability greater than 2,500 mm water column, for example up to 10,000 mm water column.

Herein, drying of the insulation layer can be made possible by the diffusion-open material in that moisture which has penetrated into the insulation layer (for example through the vapor barrier layer) evaporates and diffuses outward from the layer structure through the weather protection layer. Due to the diffusion-open material, the weather protection layer is vapor-open. The weather protection layer can be diffusion-open within the meaning of DIN 4108-3. In particular, the weather protection layer can have a water vapor diffusion-equivalent air layer thickness $s_d$ of less than 0.5 m, for example 0.05 m.

In a preferred embodiment, the diffusion-open material of the weather protection layer can be windproof.

The diffusion-open material can be a film material. In particular, the weather protection layer can be formed with a plastic film. For example, the weather protection layer can comprise a film composed of polypropylene, polyethylene copolymer and/or polypropylene scrim. In an exemplary embodiment, the diffusion-open material can have a vapor diffusion resistance coefficient μ in accordance with DIN EN ISO 12572 of 80. The diffusion-open material can be resistant to ultraviolet (UV) radiation. In particular, the diffusion-open material can comprise a film which has passed a test for durability after artificial ageing in accordance with DIN EN 1297/DIN EN 1296 and/or withstands free weathering for 6 months.

The insulation layer can be welded in between the vapor-barrier layer formed with a vapor-barrier film and the weather protection layer formed with a film material. In this case and in alternative embodiments, the layers of the layer structure can be arranged together on the support device as a completely formed layer structure.

In an alternative embodiment, the beehive can be formed without a weather protection layer. In this case, the beehive is to be protected in some other way from weathering influences, in particular precipitations, for example by a roof suitable for this purpose.

The beehive can have a fabric cover which surrounds the layer structure. In particular, the fabric cover can be stretched or hung over the beehive in order to provide additional protection from weathering influences. For example, the fabric cover can be designed to shield the beehive from water and/or wind, in particular to be water- and/or windproof. In particular, the fabric cover can be formed with a material which is resistant to UV light and/or can be designed to keep UV light away from the layer structure. The fabric cover can be formed with a woven fabric made of natural and/or synthetic fibers. For example, the fabric cover can be formed with polypropylene microfibers. The fabric cover can have a membrane, for example made of monolithic thermoplastic elastomer such as thermoplastic polyester elastomer (TPE/TEEE). Alternatively or in addition, the fabric cover can be waterproofed by impregnation.

The inner structure of the beehive can comprise an access opening which forms an access to the cavity for bees. Herein, the vapor-barrier layer can be arranged on the support device so as to surround the inner structure in an airtight manner with the exception of the access. As a result, an air exchange between the inner cavity and the surroundings of the beehive can be restricted to an air exchange made possible by the vapor-barrier layer and the access opening. In particular, this can improve an effect of the layer structure to the extent that the climatic conditions in the inner cavity are determined almost entirely by the layer structure in interaction with the behavior of a bee population located in the beehive. An airtight surrounding of the inner structure by the vapor-barrier layer can be incomplete in places due to a production process, for example at transitions between individual components of the vapor-barrier layer, wherein the vapor-barrier layer is arranged on the support device so as to surround the inner structure in an airtight manner with the exception of the access within the meaning of the disclosure if an influence of an incomplete airtight surrounding on the climatic conditions in the inner cavity is negligible. In alternative embodiments, the access opening can be provided independently of an airtight surrounding of the inner structure by the vapor-barrier layer.

The beehive can be oriented upright and the access opening can be arranged on an underside of the beehive. The underside is in particular a side of the beehive which is arranged at the bottom when the beehive is used. The access opening can have a geometry which allows a passage for bees, but is impassable for larger animals. The access opening can be closable.

A flying board can be arranged at the access opening, which flying board extends away from the access opening and the beehive and is configured to allow a landing of bees on the flying board and subsequent crawling through the access opening and a flying off of bees from the flying board after crawling through the access opening.

The support device can comprise holding elements with which a connection can be produced between the support device and the layer structure. The holding elements can comprise adhesive surfaces, clamping connectors, plug-in connectors, clips, rods or a combination thereof.

Different holding elements can be provided, which are each configured to hold one of the layers of the layer structure on the support device. For example, adhesive surfaces can be provided on which the vapor-barrier layer is adhesively bonded to the support device. Alternatively or in addition, provision can be made to hold the vapor-barrier layer on the support device with holding elements which are configured as clamping elements. The insulating layer can be laid around the vapor-barrier layer and can be held on the support device with holding elements acting in a clamping manner, for example with rod-shaped elements of the support device. Herein, the rod-shaped elements can simultaneously be structural elements of the support device. For the weather protection layer, for example, holding elements formed as adhesive surfaces and/or clamping elements can be provided, which are each or together configured to hold the weather protection layer on the support device so as to surround the insulation layer.

The vapor-barrier layer, the insulation layer and optionally the weather protection layer can be received on the support device with common holding elements. In particular, in embodiments in which the insulation layer is welded in between the vapor-barrier layer formed with a vapor-barrier film and the weather protection layer formed with a film material, the layer structure as a whole can be adhesively bonded to holding elements formed as adhesive surfaces and/or can be held on the support device by holding elements formed as clamping elements.

With the disclosure, an inner structure for a beehive is provided which comprises a first section with an inner first cavity and a first section opening which forms an access to the first cavity, and a second section with an inner second cavity, a second section opening and an access opening which forms an access for bees to the cavity of the inner structure. Herein, the second section is separably connected in an airtight manner to the first section such that the first section opening and the second section opening are at least partially congruent, as a result of which an access from the second cavity to the first cavity is formed by the second section opening and the first section opening, and the first cavity and the second cavity form an inner cavity which is configured to be taken by a bee population and to be built out with a honeycomb in wild-building manner. Herein, the inner structure further comprises the following: a section separating device and a bee separating device, wherein the section separating device is arranged at a transition between the first section and the second section and is configured to form a weak point in a honeycomb to be formed in the inner cavity at the transition between the first section and the second section, and wherein the bee separating device is formed with one or more passage openings which are arranged in the region of the first section opening and the second section opening such that a transition for bees between the second section and the first section is only enabled by the one or more passage openings, wherein the size of the one or more passage openings is selected such that worker bees can pass through the one or more passage openings and bee queens cannot pass through the one or more passage openings. The inner structure according to the disclosure can be provided as an inner structure for the beehive with the layer structure according to the disclosure. Alternatively, the inner structure can be provided independently of a layer structure for a beehive.

The bee separating device can be removable and/or deactivatable. In particular, it can be provided to provide or not to provide or to activate or deactivate the bee separating device depending on the season in order to enable or prevent an access of a bee queen to the first section.

The weak point at the transition between the first and the second section is formed by means of the section separating device such that, when the first section is separated from the second section, a honeycomb erected by bees in the inner cavity is separated in a non-destructive manner at the transition. Thus, the honeycomb is separated, for example broken, at the weak point, while the weak point ensures that the honeycomb is not further destroyed, in particular not broken, apart from the division.

In particular, the section separating device can be formed with scattered material arranged in a scattered material holding device. Hereby, one or both of respective sections of a honeycomb erected by bees formed in the first cavity and the second cavity are connected to individual elements of the scattered material and possible connections of the sections of the honeycomb through the scattered material are only punctiform. When the first section is separated from the second section, the elements of the scattered material not connected to each other do not prevent separation. Elements of the scattered material connected to a respective section of the honeycomb are lifted together with the respective section of the honeycomb from the scattered material holding device. Herein, possible punctiform connections between the sections of the honeycomb break up, while, due to the small dimensions of such possible punctiform connections, a force acting during the breaking of the connections is small and thus does not cause further destruction of the honeycomb.

The scattered material can be bark mulch. Alternatively, another scattered material or a combination of different types of scattered material can be provided, preferably a natural scattered material or a combination of different types of natural scattered material.

The first section can be dome-shaped, the second section can be tubular and the first section can be arranged above the first section, in particular when using a beehive in which the inner structure is arranged, above the first section. In the tubular embodiment of the second section, a tubular main body of the second section can be connected at its upper end to the dome-shaped first section and can be closed at the lower end with a substantially disk-shaped closure element in which the access opening is formed. In this context, it can be provided that the access opening of the inner structure comprises the entire underside of the second section which is not surrounded in an airtight manner by the vapor-barrier layer, while the inner structure is otherwise surrounded in an airtight manner by the vapor-barrier layer. Herein, the closure element can close the access opening of the inner structure in a non-airtight manner and the access opening formed in the closure element can form an access opening to the beehive through the access opening of the inner structure.

Honey space can be formed with the inner first cavity and a brood space can be formed with the inner second cavity. In an exemplary embodiment, the inner first cavity can have a volume of six to ten liters and the inner second cavity can have a volume of 36 to 40 liters.

The inner structure can be formed with at least one of the following materials: loam and wood. In an exemplary embodiment, the second section is provided with a tubular structure comprising one or more wood panels. The one or more wood panels can be thin in comparison with their area. The one or more wood panels can have a thickness in the range of 0.5 mm to 5 mm, preferably a thickness in the range of 1 mm to 3 mm, for example 1.5 mm. The one or more wood panels can be arranged in a frame. Herein, the one or more wood panels can be held on the frame by means of holding devices, wherein the one or more wood panels can be brought into a tubular shape during the connection with the frame. For the holding devices of the frame, the embodiments in accordance with the embodiments relating to the holding devices of the support device can be provided correspondingly.

The wood panel or at least one of the plurality of wood panels can be removable in order to enable an access to the second inner space while the inner structure is inhabited by a bee population. For this purpose, the removable wood panel can be held on the inner structure, in particular a frame of the inner structure, by means of a releasable and re-connectable holding element, for example by means of a clamping connection, a clip connection or a screw connection. This makes it possible to take samples from the beehive, for example for a check by the responsible veterinary office.

The first section can be formed as a clay or loam dome. Herein, the first section can comprise a loam frame which predefines a basic shape of the first section and can be formed with a material other than loam, for example a plastic. Loam can then be applied to the loam frame, in particular in intermediate spaces and/or on surfaces of the loam frame, in order to form the loam dome.

The support device can be constructed from individual parts connectable to each other. For example, the support device can comprise plastic injection-molded parts which are connected to each other. Elements of the support device can be releasably connected to each other, for example by means of one or more clip mechanisms. Alternatively or in addition, a releasable connection with clamping or screw mechanisms can be provided.

The support device can be separable, in particular in embodiments with a separable inner structure. Herein, the support device can be separable in particular in the region of the connection of the first section and the second section of the inner structure. Separability can be achieved by the support device being formed with annular connection segments which, in the connected state, rest on each other and provide an airtight connection by means of a sealing mechanism, for example a sealing ring. Herein, the annular connection segments can be connected to each other by means of a clip mechanism, a clamping mechanism and/or a screw mechanism.

The airtight connection of the first section and the second section of the inner structure can be provided by a separable structure of the support device which is airtight at a separation point. In particular, the first section and the second section can each be arranged on an annular connection segment of the support device, which are connected to each other in an airtight manner in the connected state. The section separating device of the inner structure can be formed on one or more connection segments of the support device.

The layer structure can be configured to be separable together with the support device. For example, the vapor-barrier layer can be divided into a plurality of sections which are each connected to elements of the support device in an airtight manner such that an airtight connection of the support device simultaneously provides an airtightness of the vapor-barrier layer as a whole at the separation point of the support device. The insulation layer and/or the weather protection layer can correspondingly be provided with a plurality of sections in order to enable separability of the beehive.

The vapor-barrier layer and/or the weather protection layer can be formed with a reclosable opening. In particular, a respective film of the vapor-barrier layer and/or of the weather protection layer can be formed with a reclosable opening. An, in particular liquid-tight, reclosable opening can be formed with a tongue-and-groove mechanism which, as such, is known, for example, for reclosable household plastic bags. Herein, the reclosable opening can be formed in the region of a separation point of the separable support device or can be provided independently of a separability of the support device in order to enable an access to the inner structure through the layer structure, in particular while the inner structure is inhabited by a bee population.

With a separable embodiment of the support device and of the layer structure, in particular a removal of the inner structure can be enabled. During the production of the beehive, a separable embodiment of the support device and optionally of the layer structure can enable the introduction of the inner structure before the connection of the support device and optionally of the layer structure. Herein, the inner structure as a whole or separated into a first section and a second section can be removed from or introduced into the support device.

The beehive can be configured to be arranged at its underside on a pole-shaped support structure, for example a pole with a round or rectangular cross section, for example made of wood. In particular, the beehive can comprise a receptacle at the underside, which is configured to receive an upper end section of a pole-shaped support structure and to support the beehive thereon. The beehive can thus be set up and prepared for use, in particular for the introduction of a bee population, in that the beehive with the receptacle is placed onto a pole introduced into the ground. As a result, the beehive can in particular be configured to also be used on uneven ground without having to level the ground. A plurality of beehives according to the disclosure can thus be arranged at different heights by using a plurality of pole-shaped support structures of different lengths. Additional securing means can be provided in order to secure the beehive to the pole-shaped support structure, for example screws.

The beehive can comprise one or more sensor receptacles, wherein a sensor receptacle is respectively configured to receive one or more sensors for monitoring the beehive. For example, sensors can be provided for measuring air humidity or weight and can be arranged in sensor receptacles of the beehive such that measured values received from the sensors enable an assessment of the quality of the habitat for a bee population. For example, the temperature and air humidity in the inner cavity indicate the ambient conditions for bees located therein. A change in weight can be used to infer the size and/or construction activity of a bee population. A moisture measurement in the insulation layer can enable a risk assessment for mold formation. Sensors can be provided for detecting sound signals, wherein a conclusion can be made about a stress level of a bee population living in the beehive on the basis of detected sound signals. Alternatively or in addition, one or more camera sensors can be provided for observing the bee population. The beehive can comprise a sensor array which is arranged in a sensor receptacle and which comprises different sensors for monitoring the beehive. For example, moisture, temperature, (atmospheric) pressure, acoustic, optical, movement, weight or force and/or camera sensors can be provided. Additional sensor arrays with similar and/or different sensors can be provided, which are arranged in a respective sensor receptacle.

The beehive can comprise a substrate receptacle in which a substrate is arranged as a habitat for symbionts of bees. For example, bark mulch can be provided as the substrate, which serves as a habitat for house pseudoscorpions. The substrate receptacle can be arranged at an underside of the beehive, in particular in the region of an access opening. In one embodiment, the substrate receptacle can be arranged on and close an underside of the inner structure and comprise an opening to the outside which serves as an access opening for bees.

The embodiments according to the preceding explanations concerning the beehive can be provided correspondingly in connection with the method for producing a beehive.

DESCRIPTION OF EXEMPLARY EMBODIMENTS

Further exemplary embodiments are explained in more detail below with reference to figures of a drawing. Herein:

Figure 1:
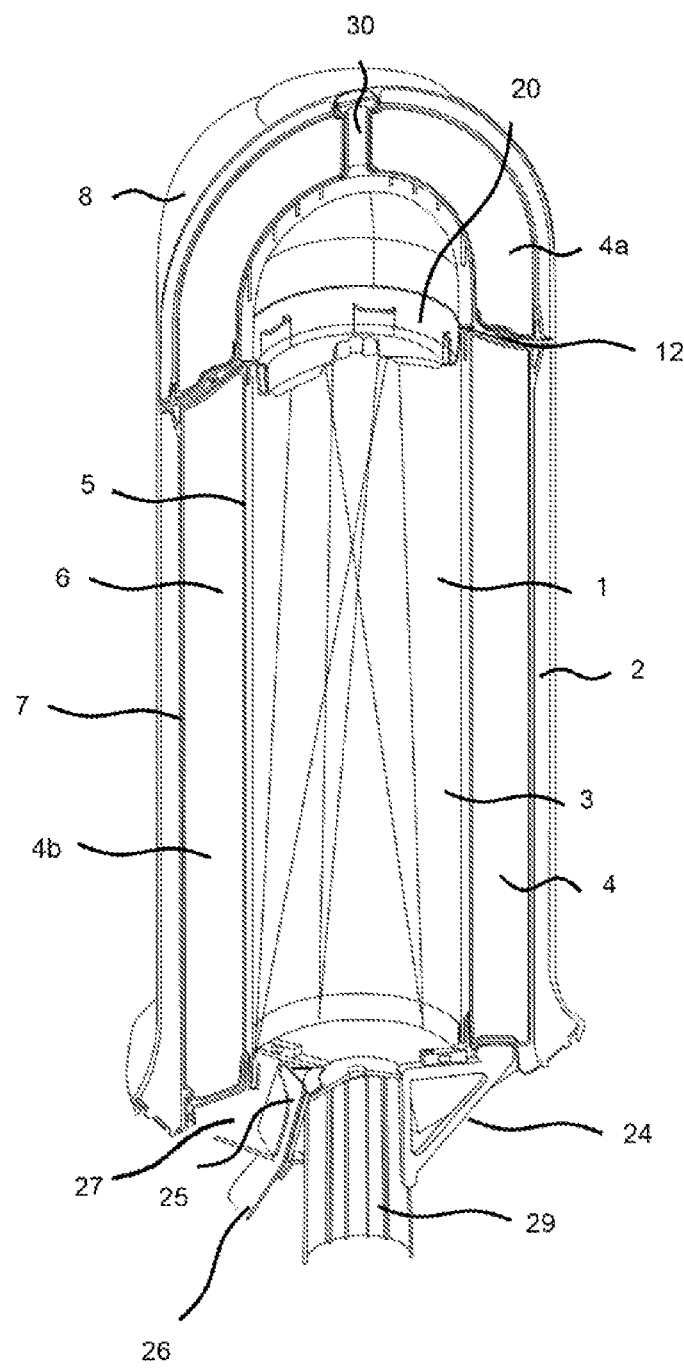
FIG. 1 shows a schematic representation of a beehive in cross section.

FIG. 1 shows a beehive in cross section. The beehive has an inner structure (1) which is received in a support device (2). The inner structure (1) serves as a housing for a bee population which can move into an inner cavity (3) formed with the inner structure (1) and can erect a honeycomb therein.

In order to ensure that a microclimate which promotes a bee population is established in the inner cavity (3), an insulating device (4) with a layer structure is received on the support device (2). In the embodiment in FIG. 1, the insulation device (4) is formed with three different layers. A vapor-barrier layer (5) is formed from a vapor-diffusion-inhibiting material which, in the embodiment shown, is a vapor-barrier film composed of polypropylene having a vapor diffusion resistance coefficient μ of 5,000 and a thickness of 0.45 mm, such that the $s_d$ value of the vapor-barrier layer (5) is 2.3 m.

The vapor-barrier layer is surrounded by an insulation layer (6) which provides heat insulation of the beehive. In the exemplary embodiment in FIG. 1, the insulation layer (6) is formed with a layer of hemp wool. Arranged around the insulation layer (6) is a weather protection layer (7) which, in accordance with the exemplary embodiment shown in FIG. 1, is composed of a membrane composed of thermoplastic polyester elastomer with a protective and covering nonwoven fabric composed of polypropylene microfibers. The weather protection layer (7) is diffusion-open and rainproof. For example, the weather protection layer (7) can have an $s_d$ value of 0.05 m and can be watertight up to 10,000 mm water column.

The support device (2) is spanned with a fabric cover (8) composed of waterproof and ultraviolet light-resistant material, which thus surrounds the layer structure of the insulation device (4).

Figure 2:
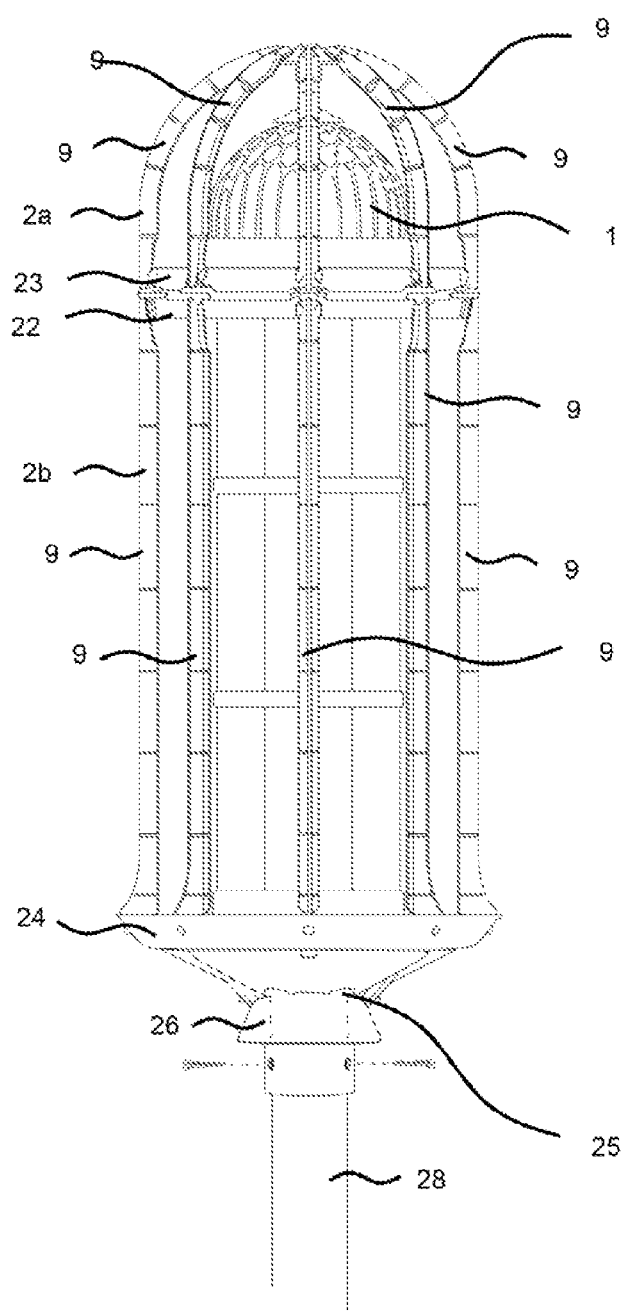
FIG. 2 shows a schematic representation of a support device with an inner structure received therein in a side view.
Figure 3:
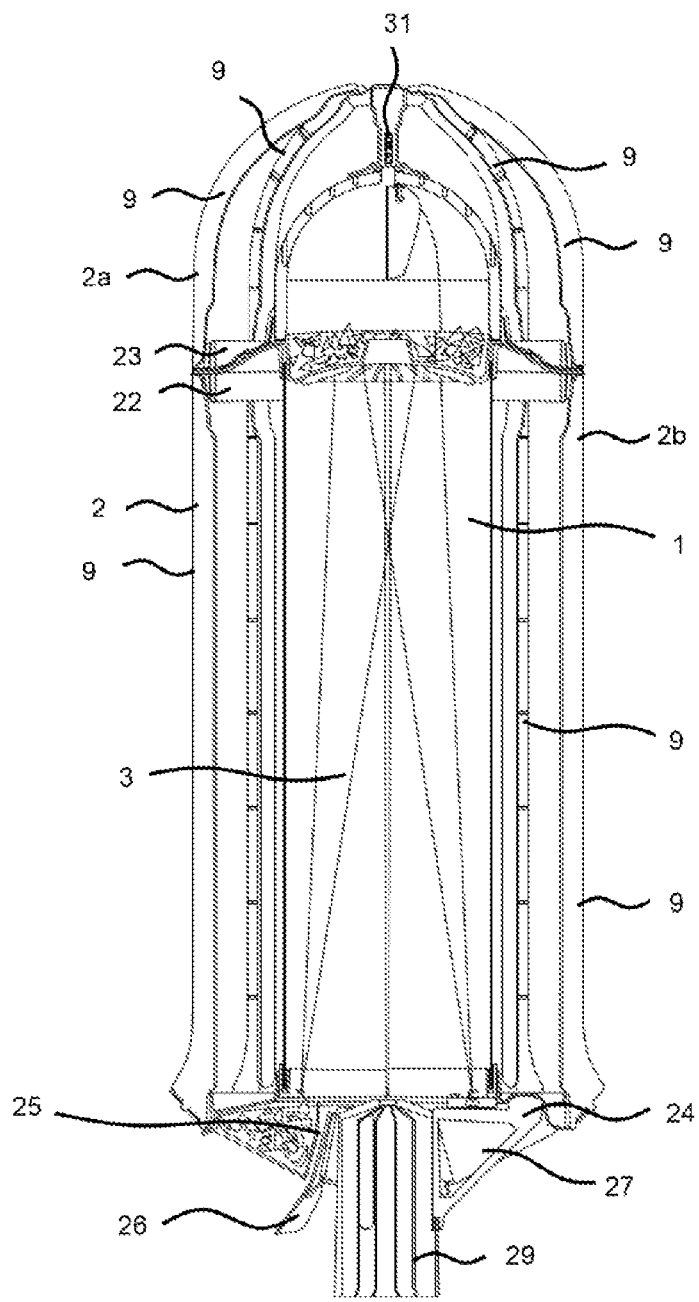
FIG. 3 shows a sectional view of the side view in accordance with FIG. 2.

FIG. 2 shows the support device (2) with the inner structure (1) received therein without the insulation device (4) in a side view. FIG. 3 shows a sectional view of the side view in accordance with FIG. 2 of the support device (2) with the inner structure (1). As can be seen in FIG. 2 and FIG. 3, the support device (2) forms a frame which is composed of a plurality of support elements (9) which are plastic injection-molded parts in the exemplary embodiment shown.

Figure 4:
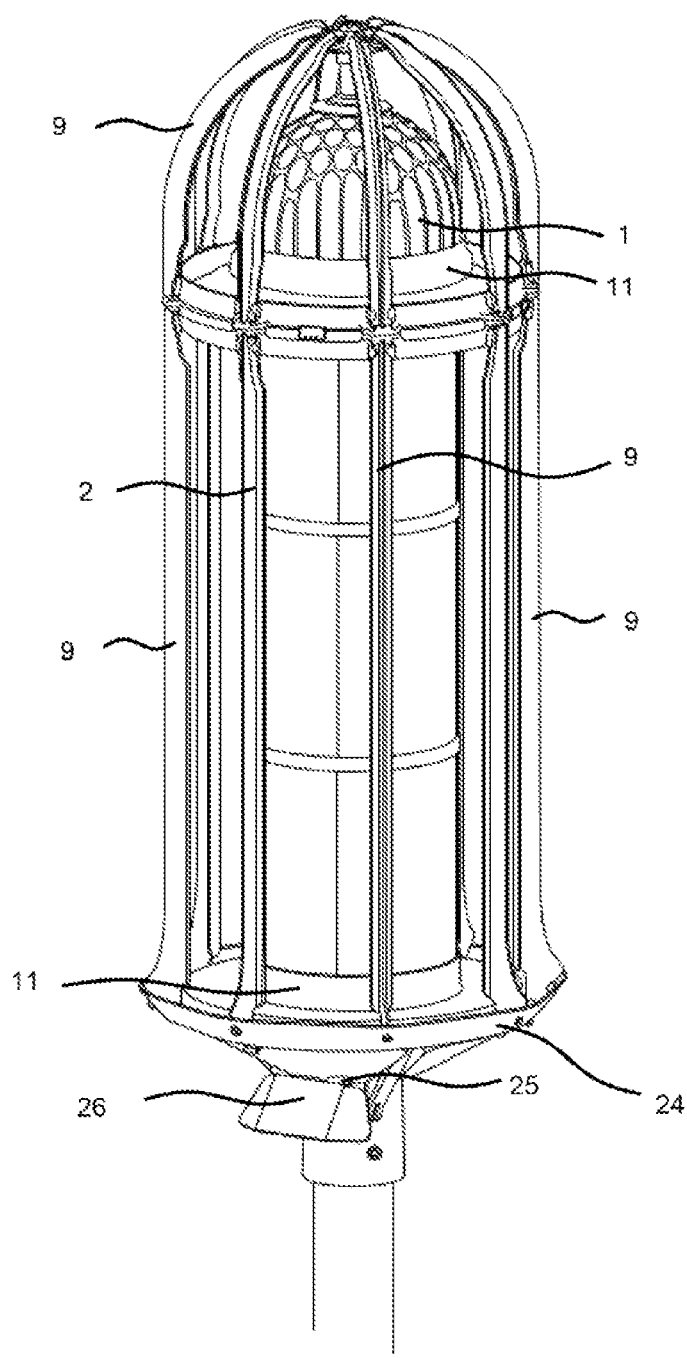
FIG. 4 shows a schematic perspective view of a support device.

FIG. 4 shows a perspective view of a support device (2) according to the disclosure with an inner structure (1).

Figure 5:
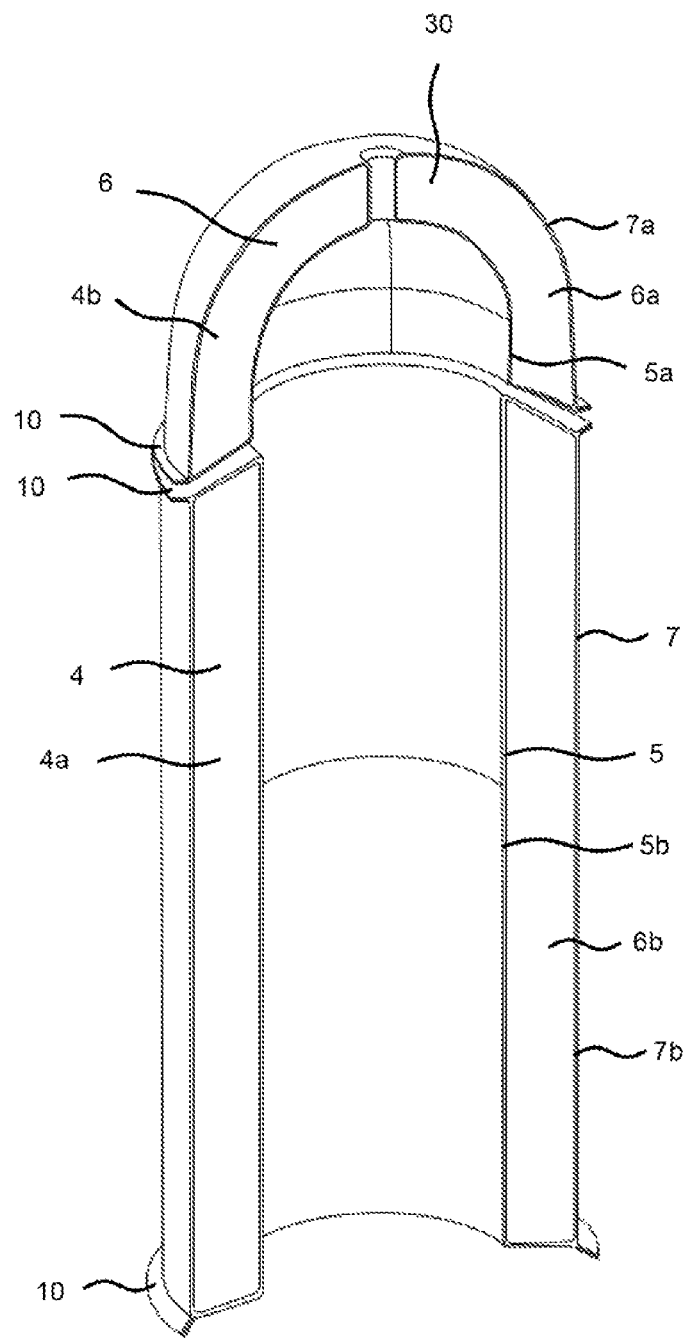
FIG. 5 shows a schematic perspective sectional view of an insulation device for a beehive.

FIG. 5 shows a perspective sectional view of an insulation device (4) for a beehive. In the embodiment shown, the insulation device (4) is formed with two sections, an upper section (4a) and a lower section (4b). Herein, the insulation device (4) is formed with a vapor-barrier layer (5), an insulation layer (6) and a weather protection layer (7), wherein the layer structure has corresponding upper sections (5a, 6a, 7a) of the layers in the upper section (4a) and has corresponding lower sections (5b, 6b, 7b) of the layers in the lower section (4b). Herein, the vapor-barrier layer (5) and the weather protection layer (7) are formed with plastic films, the respective upper (5a, 7a) and lower (5b, 7b) sections of which are welded to each other at welding edges (10) such that they surround the respective section (6a, 6b) of the insulation layer (6).

Hereby, the upper section (4a) and the lower section (4b) of the insulation device are formed as a respective overall structure, which can be arranged on a support device (2) surrounding an inner structure (1) for producing a beehive. This can be seen in the representation of FIG. 1. Herein, the upper section (4a) and the lower section (4b) of the insulation device (4) are each arranged on the support device, as a result of which the individual layers (5, 6, 7) of the layer structure of the insulation device (4) are arranged on the support device so as to surround each other and the inner structure (1).

In order to ensure the desired regulating effect of the layer structure (4) on the microclimate in the inner cavity (3) of the inner structure (1), the insulation device (4) is adhesively bonded to the support device (2) at corresponding holding devices (11) formed as adhesive surfaces. Thus, it is ensured that a moisture and air exchange takes place at these points through the insulation device (4) and not past it. For this purpose, a sealing ring (12) is additionally arranged between the upper section (4a) and the lower section (4b) of the insulation device (4).

In an alternative embodiment, the layers (5, 6, 7) of the insulation device (4) can be provided separately and arranged on the support device (2). For example, first the vapor-barrier layer (5) or the sections (5a, 5b) of the vapor-barrier layer can be fastened to the support device, wherein the fastening can take place in an airtight manner, for example by adhesively bonding the vapor-barrier layer (5) to holding elements (11) of the support device (2) formed as corresponding adhesive surfaces or with holding elements (11) which are formed as clamping elements suitable for an airtight holding. Subsequently, the insulation layer (6) or its sections (6a, 6b) can be arranged around the vapor-barrier layer (5) on the support device (2). The vapor-barrier layer can be held in a clamping manner on the support device. For example, rods of the support device can serve as holding elements (11) which prevent the insulation layer (6) from detaching from the support device. Herein, structural elements of a framework structure formed with the support device (2) can simultaneously act as holding elements (11). The weather protection layer (7) can be attached around the insulation layer (6), for example by adhesively bonding or clamping by means of corresponding holding elements (11) in accordance with the embodiments relating to the vapor-barrier layer (5) or the insulation layer (6).

Figure 6:
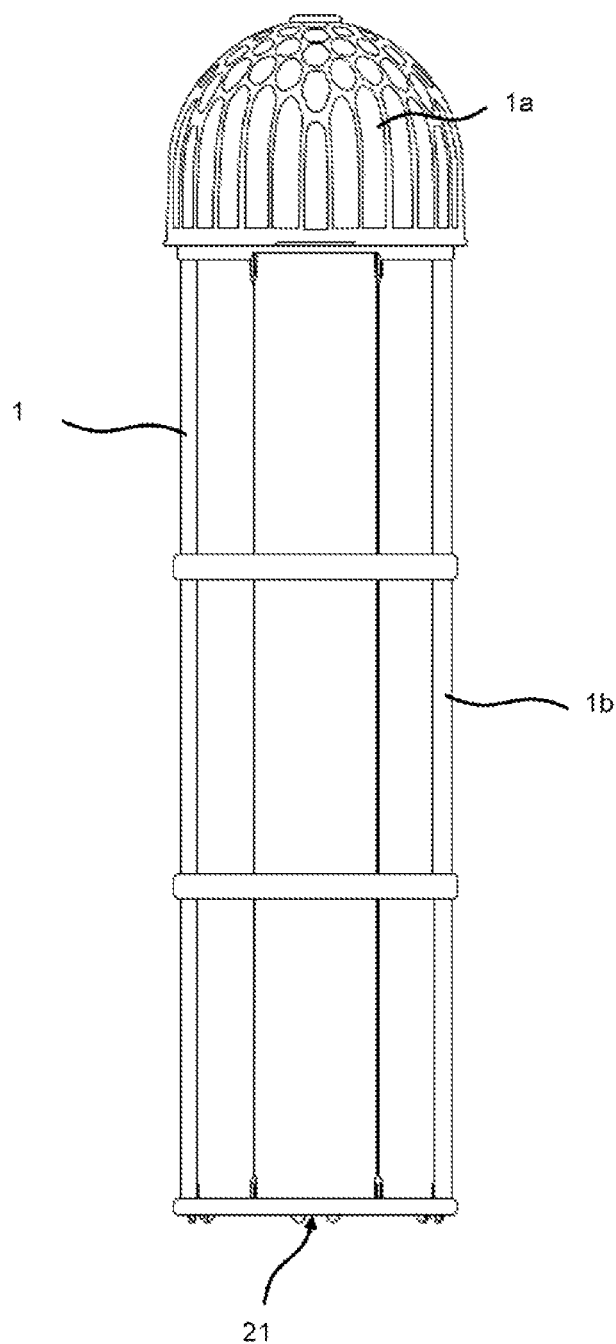
FIG. 6 shows an inner structure for a beehive in a schematic side view.
Figure 7:
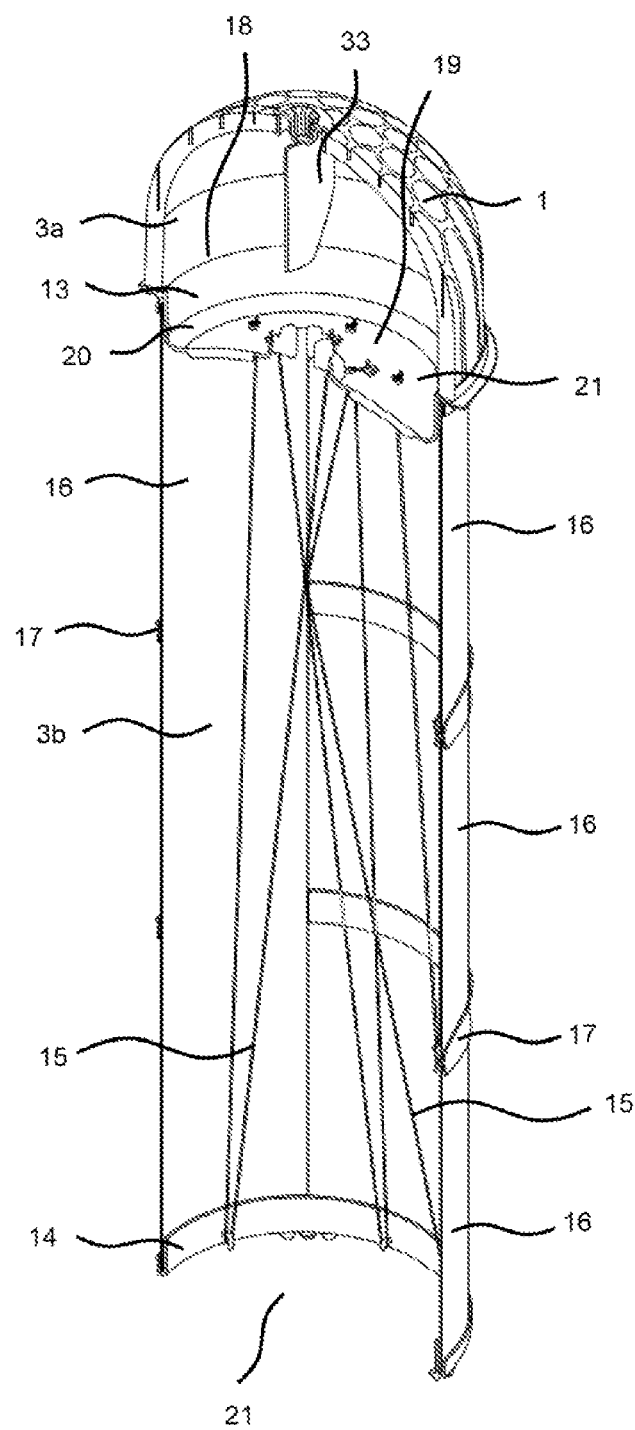
FIG. 7 shows the inner structure of FIG. 6 in a schematic perspective sectional representation.

FIG. 6 shows an inner structure (1) for a beehive in a schematic side view. FIG. 7 shows the inner structure (1) in a perspective sectional representation. The inner structure is formed with an upper first section (1a) and a lower second section (1b). Herein, the first section (1a) defines a first inner cavity (3a) and the second section (1b) defines a second inner cavity (3b), wherein the inner first cavity (3a) and the inner second cavity (3b) together form the inner cavity (3) of the inner structure (1).

As can be seen in FIG. 7, the first section (1a) is dome-shaped. In the embodiment shown, the first section (1a) is constructed from loam or clay, wherein loam has been applied to and into a framework structure with a honeycomb structure, for example a framework structure injection-molded from plastic, in order to form the dome-shaped first section (1a). In an exemplary production method for the dome-shaped first section (1a), a dome-shaped framework structure is inserted into a production mold corresponding to the outer surface of the dome shape of the framework structure. Subsequently, loam is introduced into the production mold and thus onto and into the framework structure. Excess loam is then scraped off with a scraping tool, which is adapted in its shape to the inner surface of the dome shape of the framework structure, in order to give the first section (1a) its shape. After drying of the loam, the first section (1a) can then serve for the structure of an inner structure (1) of a beehive.

In accordance with the representation of FIG. 7, the second section (1b) of the inner structure (1) is tubular. For this purpose, an upper retaining ring (13) and a lower retaining ring (14) of the lower section (1b) are clamped to each other by means of cords (15) impregnated with wax, which are each fastened to the upper (13) and the lower (14) retaining ring. By impregnating with wax, protection of the cords (15) can be provided. Alternatively or in addition, by impregnating the cords (15) with wax, a bee population can be stimulated to build out the inner cavity (3). Between the upper (13) and the lower (14) retaining ring, wood panels (16) are arranged and clamped, which form the outer wall of the tubular second section (1b). The wood panels (16) are thin in relation to their area extension and can be veneer wood panels, for example. In an exemplary embodiment, the wood panels (16) have a thickness in the range of 1.5 mm. In particular, the wood panels (16) are so thin that they can be adapted non-destructively by bending to the curvature of the outer wall of the tubular second section (1b). In accordance with the exemplary embodiment in FIG. 7, the second section (1b) comprises a plurality of wood panels (16) on a part of its circumference along its height, which are each separated and held by intermediate rings (17). For this purpose, the intermediate rings (17) are formed with an H-profile (cf. FIG. 7), into which the wood panels are inserted. In circumferential sections, in which only one wood panel (16) is provided along the height of the second section (1b), the intermediate rings (17) herein only surround this wood panel without dividing and holding it, as can be seen in FIG. 7 on the left-hand side. Herein, the intermediate rings (17) in accordance with the embodiment in FIG. 7 do not have an H-profile in circumferential sections in which no separation of wood panels (16) is provided. The clamping by means of the cords (15) holds the wood panels (16) in the rings (13, 14, 17) and thus the lower section (1b) together. It can be provided that one or more of the wood panels (16) can be removed individually from the lower section (1b) in order to enable access to the second cavity (3b), in particular also when the inner cavity (3) is taken by a bee population. In particular, it can be provided that, in a segment in which a plurality of wood panels (16) are arranged one above the other along the height of the second section (1b), one, individual or all of the wood panels (16) are removable in order to enable access to the second cavity (3b). For this purpose, the rings (13, 14, 17) of the second section (1b) can be formed with corresponding holding elements for the wood panels (16). The wood panels (16) can be provided as flat wood panels (16), i.e. not adapted to the tubular shape of the lower section (1b), which are only adapted to the tubular shape of the lower section (1b) by fastening them to the rings (13, 14, 17) of the lower section (1b), for example by clamping them.

The opening of the dome of the dome-shaped first section (1a) forms a first section opening (18) which forms an access to the first cavity (3a). The upper opening of the tube of the second section (1b) forms a second section opening (19). An access from the second cavity (3b) into the first cavity (3a) is formed by the overlap of the first (18) and the second (19) section opening. This access is closed by the bottom of a scattered material holding device (20) formed with a pot-shaped formation of the upper retaining ring (14). As a result, the bottom of the scattered material holding device (20) forms a bee separating device, in the center of which an opening is provided. An insert is removably arranged in the opening and comprises one or more passage openings, the size of which is selected such that worker bees can pass through the one or more passage openings and bee queens cannot pass through the one or more passage openings. In this way, when the insert is arranged in the opening, a honey space is formed with the first cavity (3a) and a brood space is formed with the second cavity (3b), since the queen of a bee population can lay eggs only in the brood space, since she cannot reach the honey space through the insert with which a so-called queen excluder is formed. The honey space is then only reached by worker bees and used by them to store honey.

The lower opening of the tube of the second section (1b) thus forms an access opening (21) with which an access for bees to the cavity (3) of the inner structure (1) is provided.

The pot-shaped scattered material holding device (20) is filled with a scattered material, for example bark mulch, as can be seen by way of example in FIG. 3. As a result, a section separating device is formed in the scattered material holding device (20), since a bee population living in the inner structure (1), when building out with honeycomb of the second cavity (3b), will build up to the underside of the bottom of the scattered material holding device (20) and, when building out the first cavity (3a), will build up to the scattered material arranged in the scattered material holding device (20). A weak point is thus formed by the scattered material in the scattered material holding device (20), at which weak point the honeycomb in the inner cavity (3) can be separated. If the first section (1a) is lifted from the second section (1b), individual elements of the scattered material, to which the honeycomb in the first cavity (3a) is attached, are also lifted where applicable. Since the elements of the scattered material provide no or only a small counter-force to such lifting, the honeycomb is not subjected to any action of force which could lead to destruction of the honeycomb. Thus, the weak point in the honeycomb formed with the scattered material holding device (20) and the scattered material arranged therein, when separating the inner structure (1) into the first (1a) and the second (1b) section, enables a non-destructive separation of the honeycomb in accordance with a brood space in the second cavity (3b) and a honey space in the second cavity (3a).

Figure 8:
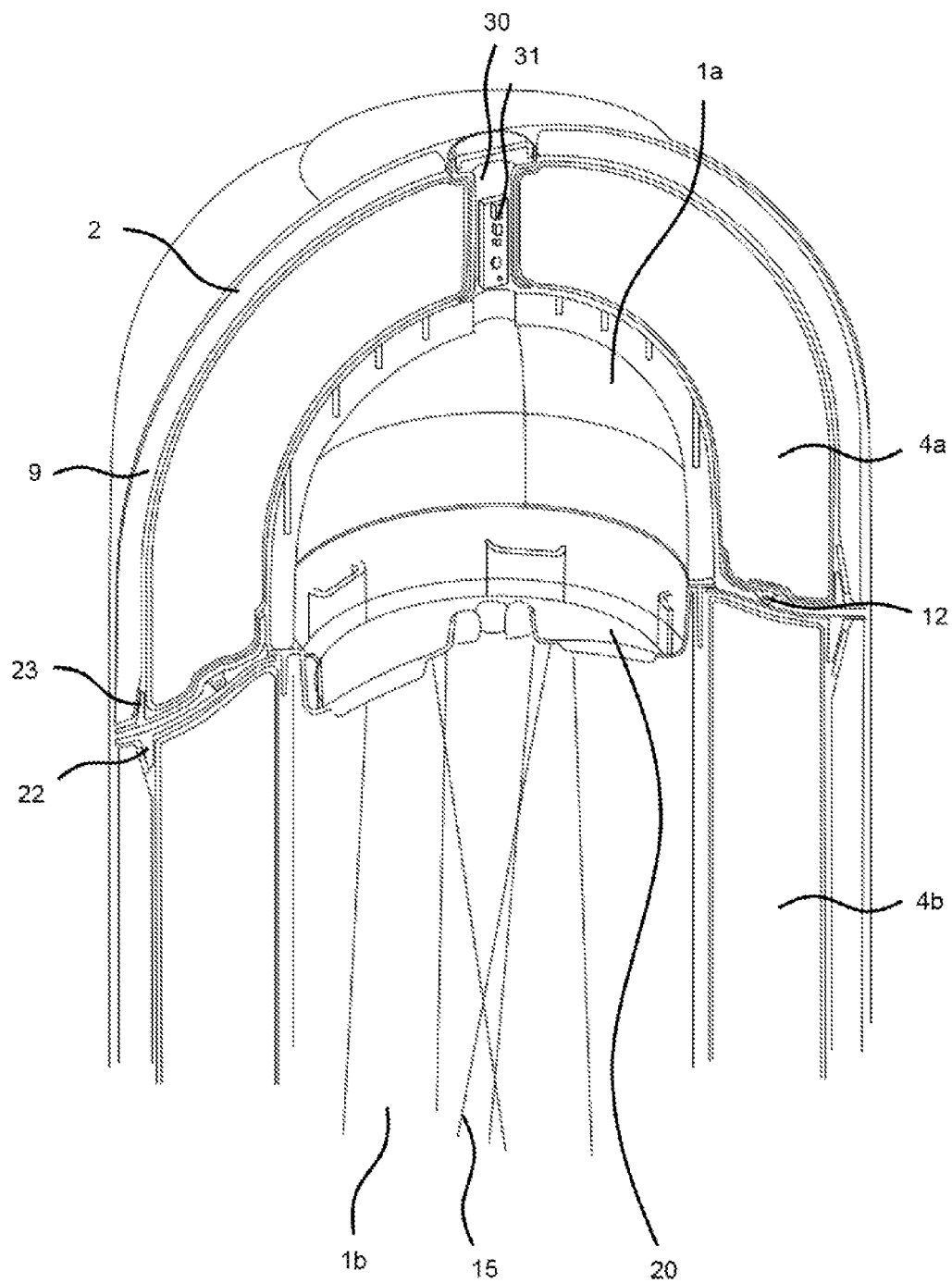
FIG. 8 shows a detailed view of a sectional view of a beehive.

FIG. 8 shows a detailed view of a sectional view of a beehive with an inner structure (1), a support device (2) and an insulation device (4), in which a transition between a first section (1a) and a second section (1b) of the inner structure (1) can be seen. Herein, in order to enable a separation of the first section (1a) from the second section (1b), the support device (2) is configured to be separable together with the insulation device (4). For this purpose, the support device (4) has a lower section ring (22) and an upper section ring (23), at which the support device can be separated into an upper first section (2a) and a lower second section (2b). Herein, the first section (1a) of the inner space (1) can be arranged independently of the second section (1b) of the inner space (1) in the first section (2a) of the support device (2) and it can be possible to arrange the second section (1b) of the inner space (1) independently of the first section (1a) of the inner space (1) in the second section (2b) of the support device (2). As a result, it can in particular be achieved that the inner structure (1) can be divided together with the support device (2) and the insulation device (4) arranged at the support device (2), in particular into a brood space and a honey space. Herein, an insulation, in particular a sealing ring (12) between the lower (22) and the upper (23) section ring can ensure that the microclimate in the inner cavity (3) is determined by the insulation device (4). Herein, the lower (22) and the upper (23) section ring together with the insulation, thus the sealing ring (12) in the exemplary embodiment shown, can provide the connection between the first section (1a) and the second section (1b) of the inner structure (1).

The lower (22) and the upper (23) section ring can be connectable to each other by holding elements, for example by clip connection elements. Generally, components of the support device can be connected to each other with clip connection elements. Alternatively or in addition, other connection elements, for example screw elements, can be provided.

In the exemplary embodiment shown in FIG. 1, the support device (2) is formed with a lower disk segment (24). The lower disk segment (24) closes the access opening (21) of the inner structure (1) and in turn comprises a bee access opening (25) which is adapted in its size to enable an access for bees to the inner cavity (3). A flying board (26) is formed at the bee access opening (25), which facilitates a flying off and a landing of bees and can be reached by the bees crawling from the bee access opening (25) and vice versa.

A substrate receptacle (27) is additionally formed in the lower disk segment (24), into which a substrate is introduced which serves as a habitat for symbionts of honey bees. In the left part of FIG. 3, the substrate can be seen in the substrate receptacle (27). In particular, a habitat for house pseudoscorpions can thus be provided. The substrate can be bark mulch, for example.

In one embodiment, the substrate receptacle (27) can be configured to be removable. Herein, a lever can be provided for unlocking the substrate receptacle in order to subsequently remove the same. In particular, a view into the inner cavity (3) can thus be enabled, in which it is made possible to observe a bee population living in the cavity (3) without disturbing the same to a considerable extent.

Figure 9:
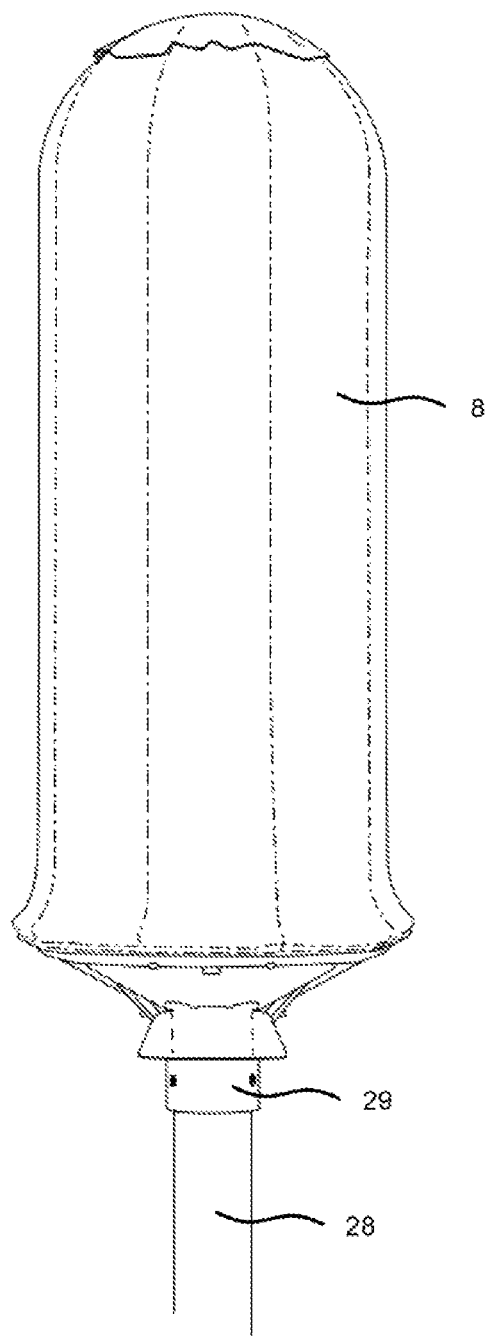
FIG. 9 shows a schematic overall view of a beehive.

FIG. 9 shows a schematic overall view of a beehive according to the disclosure. Herein, the beehive is spanned with a fabric cover (8) which, as can be seen in FIG. 1, rests on structural elements of the support device (2) and offers additional protection from UV radiation, hail, rain and other weathering influences.

As can be seen in FIG. 9, the beehive can be arranged on a pole (28) during use. For this purpose, the beehive has a pole receptacle (29), with which the beehive can be placed onto a pole (28). As a result, in particular a flexible use of the beehive can also be enabled on uneven ground, since a leveling of the ground is not necessary. Instead, a pole (28) can be introduced into the ground and the beehive can be placed onto the pole with the pole receptacle (29). The beehive can herein additionally be secured on the pole (28), for example by screwing. This is indicated by way of example in FIG. 2. By screwing, for example, protection from theft or vandalism can be provided.

In accordance with the embodiments shown in FIGS. 1 and 5, the insulation device comprises an opening on the upper side, with which a sensor receptacle (30) is formed. The sensor receptacle (30) is configured to receive a sensor array (31) for monitoring the bee population in the inner cavity (3). By introducing the sensor array (31), the sensor receptacle (30) is closed, with the result that the microclimate in the inner cavity (3) is still determined by the layers (5, 6, 7) of the layer structure of the insulation device (4). Alternatively or in addition, a further sensor array (32) can be provided in the region of the pole receptacle (29). The sensor arrays (31, 32) can comprise, for example, (air) moisture, temperature, (atmospheric) pressure, acoustic, optical, movement, weight or force, and/or camera sensors.

Figure 10:
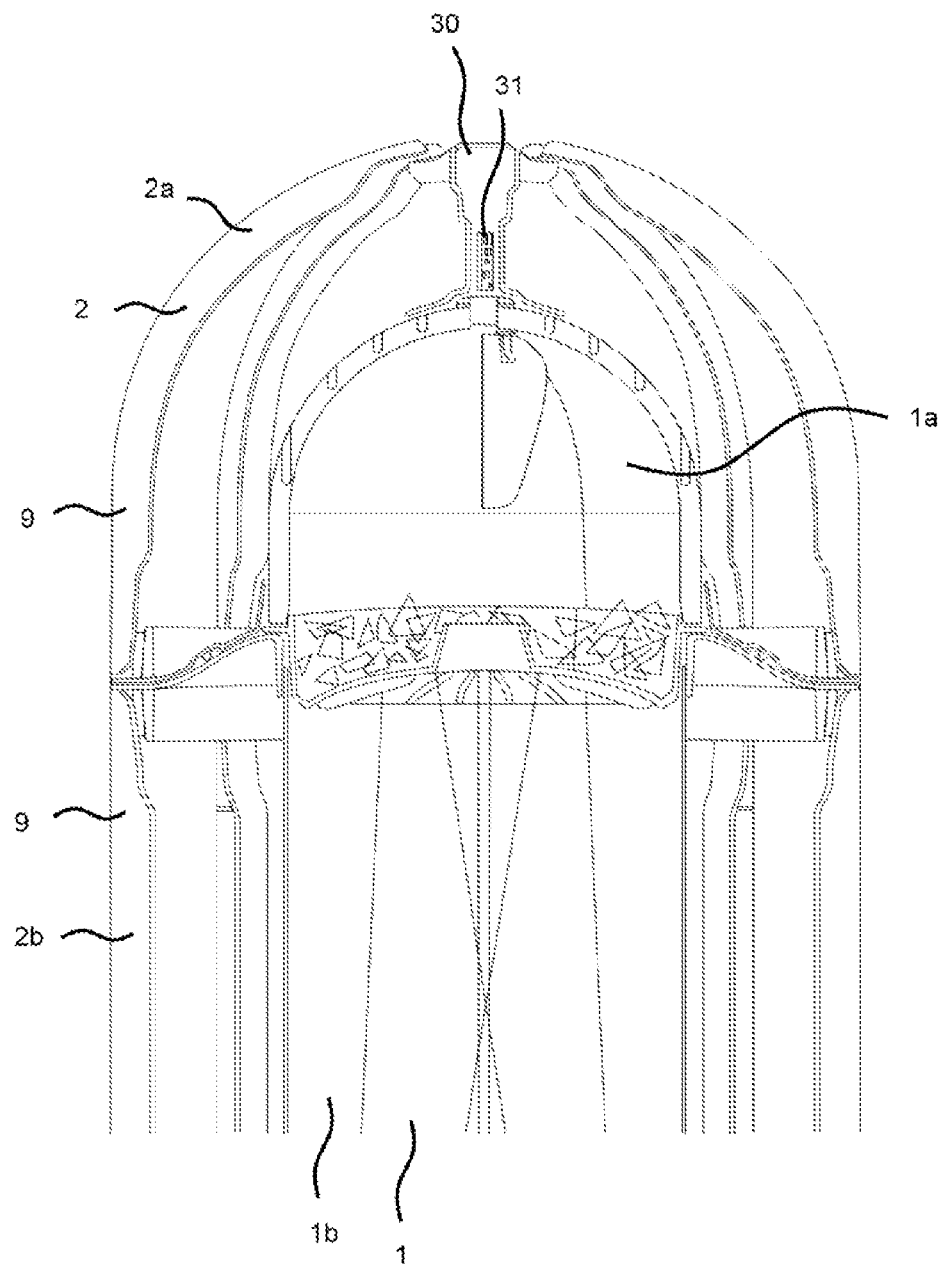
FIG. 10 shows a schematic sectional view of an upper part of a beehive.

FIG. 10 shows an embodiment with a sensor array (31) which is arranged in the sensor receptacle (30) and which comprises moisture, temperature, atmospheric pressure, microphone and movement sensors.

Figure 11:
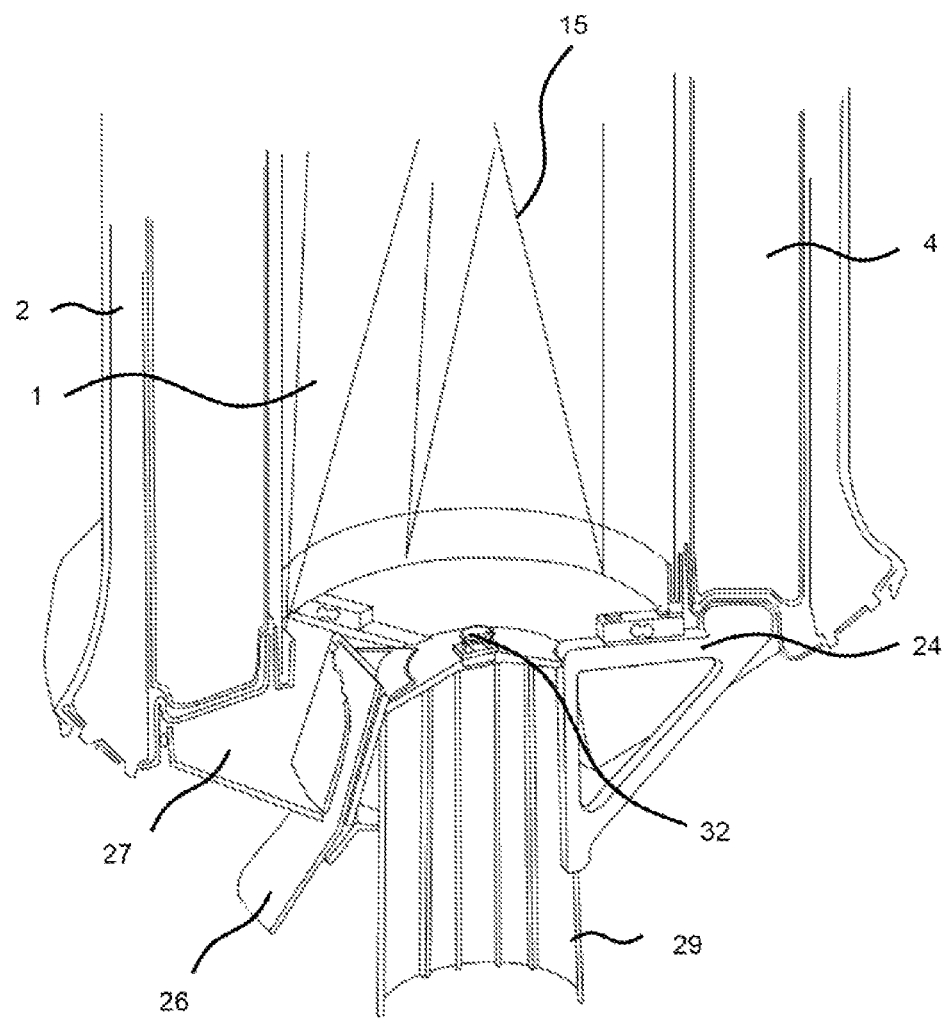
FIG. 11 shows a schematic sectional view of a lower part of a beehive.

In the embodiment in accordance with FIG. 11, a sensor array (32) which comprises a weight sensor and a camera is arranged in the region of the pole receptacle (20) on the lower disk segment (24).

Figure 12:
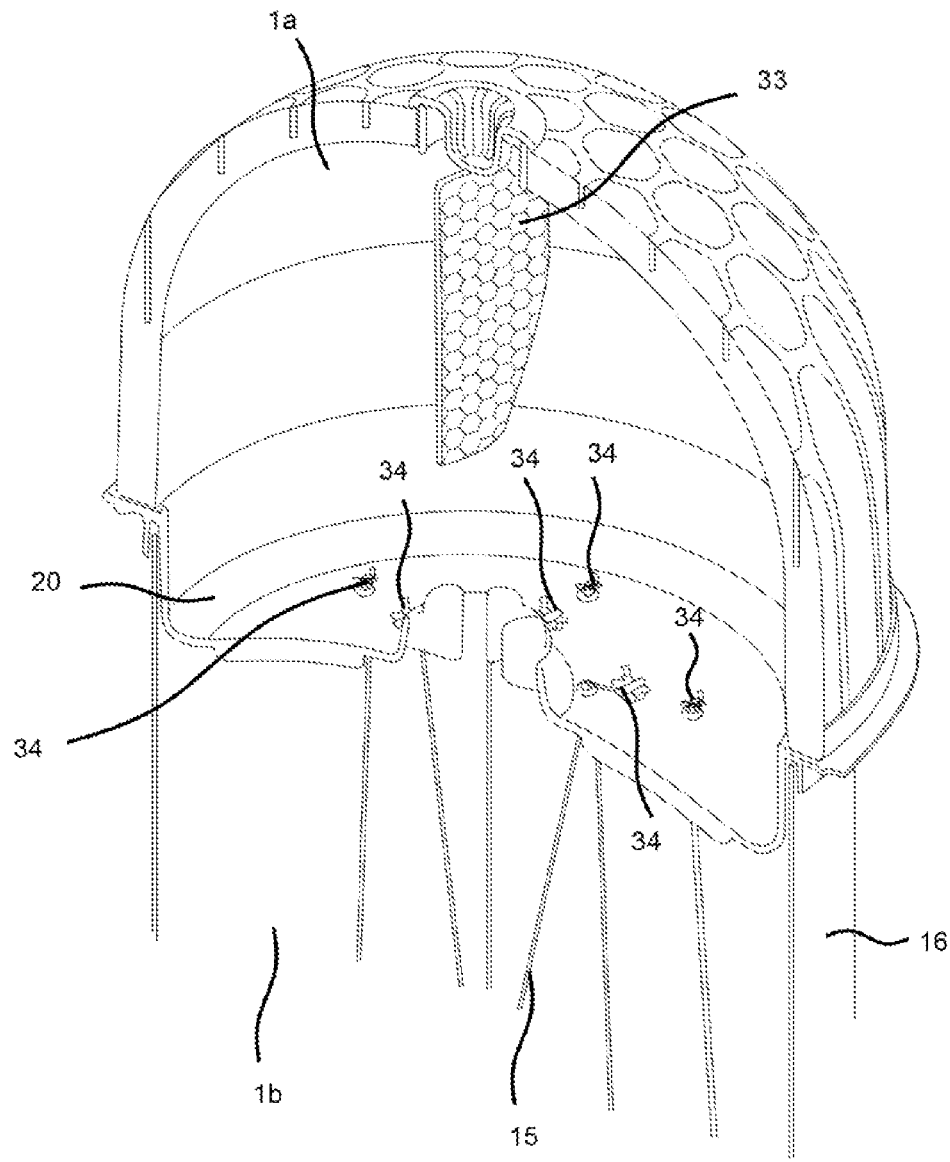
FIG. 12 shows a schematic sectional view of an upper part of a beehive.

FIG. 12 shows an embodiment in which a wax holder (33) is arranged in the inner first cavity (3a). Such wax holders are known per se and can consist of wax mats which are soldered into known Langstroth hives when used. By means of the wax holder (33), a bee population can be stimulated to subsequently build out the inner first cavity (3a) starting from the wax holder (33). In this sense, the wax holder (33) can be understood as a "starter" or "template" for a bee population.

In the embodiment of FIG. 12, the cords (15) impregnated with wax are provided with knots (34) for fastening to the bottom of the scattered material holding device (20).

The features disclosed in the above description, the claims and the drawing can be of importance both individually and in any desired combination for the realization of the different embodiments.

The invention claimed is:

1. A beehive comprising:
    an inner structure having an inner cavity configured to be taken from a bee population and built out with a honeycomb;
    a support device in which the inner structure is received; and
    an insulation device which is received on the support device and comprises a layer structure,
    wherein the layer structure comprises:
    a vapor barrier layer formed with a vapor diffusion inhibiting material, which is arranged on the support device surrounding the inner structure; and
    an insulation layer formed with a heat insulating material, which is arranged on the support device surrounding the vapor barrier layer;
    wherein the inner structure includes
    a first section having an inner first cavity and a first section opening forming an access to the first cavity, where the first section is dome-shaped; and
    a second section having an inner second cavity, a second section opening and an access opening forming an access for bees to the cavity of the inner structure, where the second section is tubular and the first section is arranged above the second section.

2. The beehive according to claim 1, wherein the vapor barrier layer is a vapor barrier film.

3. The beehive according to claim 1, wherein the layer structure comprises a weather protection layer formed with a diffusion-open material, which is arranged on the support device surrounding the insulation layer.

4. The beehive according to claim 3, wherein the diffusion-open material is a film material.

5. The beehive according to claim 1, comprising a fabric cover surrounding the layer structure.

6. The beehive according to claim 1, wherein
the inner structure of the beehive comprises an access opening forming an access to the cavity for bees; and
the vapor barrier layer is arranged on the support device surrounding the inner structure in an airtight manner with the exception of the access.

7. The beehive according to claim 1, wherein the support device comprises holding elements by means of which a connection between the support device and the layer structure can be established.

8. The beehive according to claim 1, wherein the inner structure is formed with at least one of the following materials: loam and wood.

9. The beehive according to claim 1, wherein the heat insulating material is moisture permeable.

10. The beehive according to claim 9, wherein the heat insulating material comprises hemp wool.

11. The beehive according to claim 1,
wherein the second section is detachably connected to the first section in an airtight manner such that
the first section opening and the second section opening are at least partially congruent, whereby an access from the second cavity to the first cavity is formed by the second section opening and the first section opening; and
the first cavity and the second cavity form the inner cavity configured to be taken from a bee population and built out with a honeycomb in wild-building manner,
wherein the inner structure further comprises:
a section separation device arranged at a transition between the first section and the second section and configured to form a weak point in a honeycomb to be formed in the inner cavity at the transition between the first section and the second section; and
a bee separation device having one or more passage openings arranged in the region of the first section opening and the second section opening such that a transition for bees between the second section and the first section is only enabled by the one or more passage openings, wherein the size of the one or more passage openings is selected such that worker bees can pass through the one or more passage openings and bee queens cannot pass through the one or more passage openings.

12. The beehive according to claim 11, wherein the section separation device is formed with scattered material arranged in a scattered material holding device.

13. The beehive according to claim 12, wherein the scattered material is bark mulch.

* * * * *